United States Patent [19]
Génini et al.

[11] 4,377,186
[45] Mar. 22, 1983

[54] FLOATING FLEXIBLE TUBES

[75] Inventors: Maurice Génini, Creteil; Christian Athé, Le Mee; Jean-Paul Aubert, Puteaux, all of France

[73] Assignee: Coflexip, Rueil, France

[21] Appl. No.: 269,505

[22] Filed: Jun. 1, 1981

Related U.S. Application Data

[63] Continuation of Ser. No. 13,177, Feb. 21, 1979, abandoned.

[30] Foreign Application Priority Data

Feb. 21, 1978 [FR] France .................................. 78 04886

[51] Int. Cl.³ ........................ F16L 11/04; F16L 11/06
[52] U.S. Cl. .................................... 138/111; 138/122; 138/129; 138/133; 138/154
[58] Field of Search ............... 138/111, 122, 129, 133, 138/134, 135, 136, 150, 154, 103; 174/47

[56] References Cited

U.S. PATENT DOCUMENTS

| | | | |
|---|---|---|---|
| 2,288,094 | 6/1942 | Karmazin | 138/154 X |
| 3,199,541 | 8/1965 | Richitelli | 138/129 |
| 3,252,483 | 5/1966 | Swan | 138/122 |
| 3,255,780 | 6/1966 | Squirrell | 138/129 X |
| 3,542,078 | 11/1970 | Lykle | 138/122 |
| 4,119,123 | 10/1978 | Samuels | 138/122 |

*Primary Examiner*—James E. Bryant, III
*Attorney, Agent, or Firm*—Cushman, Darby & Cushman

[57] ABSTRACT

A flexible buoyant conduit which includes a thermoplastic pressure-resistant stratum. The pressure resistant stratum is formed by spirally winding, and overlapping, a belt or band the cross-section of which is in the form of an elongated S-shape having a groove in the bottom wall of each channel.

4 Claims, 5 Drawing Figures

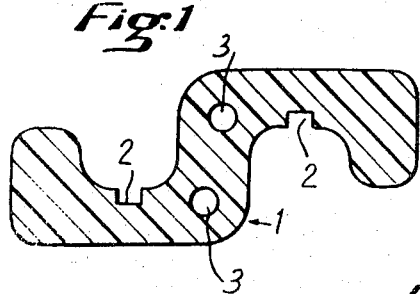
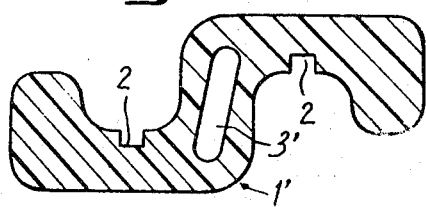
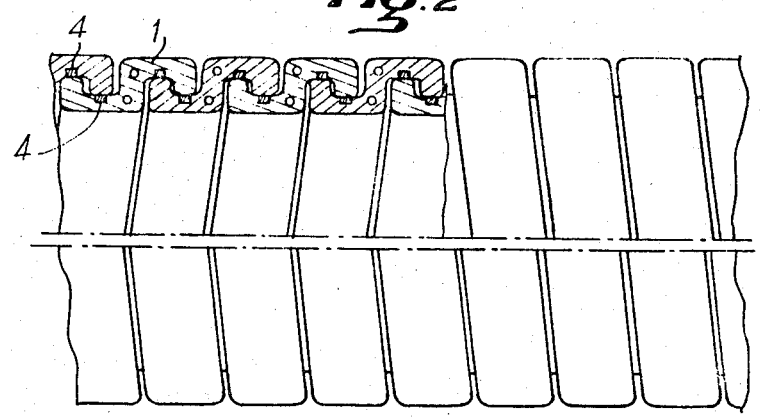
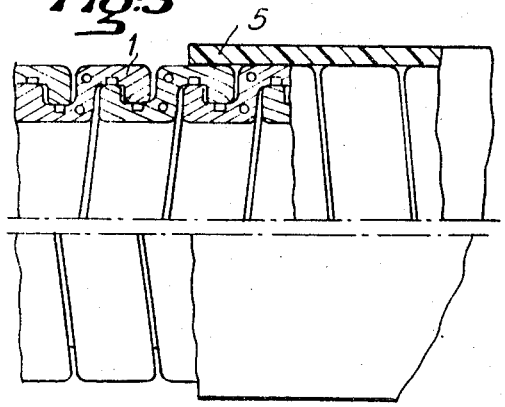
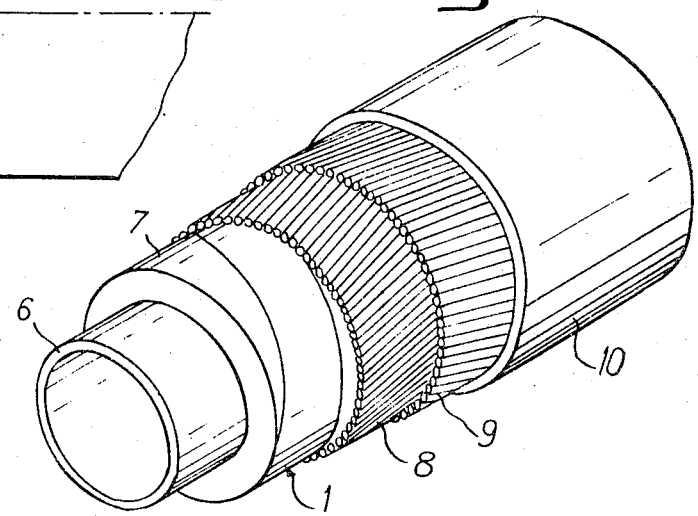

FLOATING FLEXIBLE TUBES

This is a continuation of application Ser. No. 13,177 filed Feb. 21, 1979, now abandoned.

The present invention is directed to flexible conduits.

At present, numerous types of flexible conduits and buoyant conduits are known. Generally, to assure the buoyancy, cable buoys are fastened to the conduit or incorporated in them. For example, in French application No. 75 37791 (filed Dec. 10, 1975 and published under No. 2 294 380, corresponding to U.S. Pat. No. 4,000,759), buoyancy is assured by use of a double series of hollow tubular elements rolled in a helix.

However, like structures of flexible conduits known before, such a structure does not provide adequate mechanical properties, particularly resistance to radial pressure and crushing or "collapse", (in spite of the presence of metallic reinforcement elements destined to improve the mechanical properties) in certain applications, for instance, in the transport of hydrocarbons and of undersea polymetallic nodules.

The present invention directs itself to the realization of a flexible buoyant conduit (tube) which is characterized by good mechanical properties, notably with respect to radial resistance to crushing and axial resistance to pressure.

The present invention is also concerned with conduits which can be formed directly in the vicinity of the place of use, that is to say, for example, on a deep-sea oil rig exploratory platform, on a floating factory, or on a ship charged with laying down cable.

Thus, flexible tubes of very great diameter and of great length which would otherwise not be transportable to the place of use are realized in accordance with the invention.

The present invention has for an object a flexible buoyant conduit characterized by the fact that it comprises a band of thermoplastic material having preferably a density less than 1, the cross-section of the band being in the form of an elongated S having an inwardly facing channel and an outwardly facing channel, the bottom wall of each channel having a groove therein extending substantially parallel to the direction of the channel; the band is wound spirally with slight threading and with interlocking at each successive single turn of a spiral; and at least one watertight element.

In one embodiment, each of the watertight elements is an elongated element such as a rush, cane or guard of an elastomer, which is rolled spirally and disposed in at least one of the spiral passages formed by the grooves in the channels when the band is wound spirally.

In a second embodiment, the watertight element is an external tubular sheath or an external adhesive tape covering, for example, of a polyamide such as a polyamide made from a polymer of 11-aminoundecanoic acid derived from castor oil, sold under the trademark RILSAN.

The band, having a cross-section in the form of the elongated S, can be realized, notably by extrusion, of any thermoplastic material having a density preferably less than 1 and having the properties of being resistant to corrosion by sea water and by chemical products, notably hydrocarbons, transported more often under pressure.

In accordance with the invention, it is advantageous to produce the band, having the cross-section in the form of the elongated S from a thermoplastic material selected from the group consisting of polyethylene, polypropylene, and polyamide, known as RILSAN.

In a particular embodiment of realizing the bands, it is provided with at least one conduit or channel in its central part (core) to be used for, for example, ballast in the tube when ballast is necessary.

Another object of the present invention equally is a flexible buoyant tube characterized by the fact that it comprises an internal tubular sheath which is watertight; a stratum of resistance to pressure constituted by a band of thermoplastic material, which has a density preferably less than 1, the cross-section of the band being in the form of an elongated S and rolled spirally with threading and with overlapping to cause interlocking of each successive spiral; at least one bracing, constituted of ropes of thermoplastic material, having a density of less than 1, notably of polypropylene; and an external tubular sheath which is watertight.

In this embodiment, the flexible buoyant tube can sustain elevated internal pressure during use, and can sustain under pressures of many tens of bars.

The two sheaths which are watertight can, for example, be of a polyamide, such as RILSAN.

In a particular form of the embodiment of the invention, there are provided two sets of bracing each constituted of ropes disposed side by side and rolled spirally, each of the two strata of bracing being rolled to form 2 helixes of opposite direction.

Thus, according to the invention, a flexible buoyant tube is realized which is characterized by excellent radial resistance to crushing because of the presence of a bed formed by winding, with jointing of successive spirals, a band which is self-locking by virtue of its cross-section in the form of an elongated S.

In order to illustrate the present invention, the following description presents non-limiting examples of several embodiments of the invention by reference to the attached drawings, in which:

FIG. 1 represents a cross-sectional view of a profile of the band used for the invention;

FIG. 2 represents a cross-sectional view of an embodiment of a tube according to the invention;

FIG. 3 represents a partial cross-section of a second embodiment of the tube of the invention;

FIG. 4 represents an alternative embodiment of the cross-section of the band of the invention;

FIG. 5 represents a perspective cutaway of a third embodiment of the tube of the invention.

In FIG. 1, there is a view of the cross-section of a band 1 in the form of an elongated S, used for realizing the tube of the invention. According to one embodiment, this profiled band is formed of polypropylene which has a density of 0.91. In one example, the tubes can have a diameter of 40.64 cm (16 inches) while the profiled band has a transverse section of a length of 140 mm, a height of 60 mm, and a mean thickness of 20 mm.

The band can be provided with two grooves 2 and two conduits 3 used for ballast.

The tube of FIG. 2 is realized by use of a profiled band represented in FIG. 1 by winding the profiled band spirally, with slight threading step, with interlocking between each successive spiral. Thanks to its profile, the band is self-fastening and when it is wound spirally it is provided at a helicoidal passage formed by groove 2 with an elongated flexible watertight element such as a guard, cane or rush.

Because of the simplicity of realization of this tube, such as represented in FIG. 2, it is possible to realize the tube directly in the neighborhood of the place of use by simply winding the profiled band and the watertight rush, cane or guard. It is possible after use, if desirable, to unwind the profiled band and to roll it on bobbins for storage with a view to reuse at another time. In the mode of realizing the embodiment represented by FIG. 3, the tube is constituted of a helix of profiled band 1 with a cross-section in the form of an elongated S and a watertight tubular external sheath 5, disposed thereover.

In an alternative embodiment of a profiled band 1' presented in FIG. 4, it is provided with channel 3' of oblong cross-section which can be used for ballast.

FIG. 5 presents a third embodiment of a tube according to the invention. This tube comprises a watertight internal tubular member 6; a stratum of resistance to pressure of a spirally wound profiled band 1, or optionally 1'; two strata of resistance to axial pressure 8 and 9, each constituted of a plurality, for example, 76, cords of polypropylene each of the cords having, for example, a diameter of 12 mm for a tube with a nominal diameter of 40.64 cm (16 inches), the cords of each of the strata 8 and 9, being disposed spirally in an opposite sense to each other. Lastly, the tube includes an external watertight tubular sheath. The internal sheath 6 and external sheath 10 are, for example, made from a polyamide, such as RILSAN.

It is thus possible to realize, thanks to the invention, flexible buoyant tubes of great length, and of nominal diameter for use at pressures of 20 bars, which are characterized by a great resistance to axial pressure and radial crushing, and mechanics such as hydrostatic.

Although the invention has been described in conjunction with particular embodiments, it is evident that the invention is not limited to those embodiments and that the invention embraces numerous modifications without departing from the broad spirit of the invention. In particular, the cross-section of the profiled band can be modified in shape or size as long as the band realized remains self fastening.

What is claimed is:

1. A flexible buoyant tube comprising a belt which is self-fastening and of a thermoplastic material having a density of less than 1, the cross-section of said belt being in the form of an elongated S-shape, said S-shape having an inwardly facing channel and an outwardly facing channel, the bottom wall of each channel having a groove therein extending substantially parallel to the direction of the channel and said belt being wound spirally with overlap and threading and with interlocking of successive spirals so that each edge of each spiral overlies a groove in the adjacent spirals whereby said grooves form spiral passages, and at least one elongated flexible watertight element which is spirally wound and disposed in at least one of said passages.

2. A tube as in claim 1 wherein the watertight element is made of an elastomer.

3. A tube as in claim 1 or 2 wherein the belt includes at least one conduit in the central part thereof.

4. A tube as in claim 1 wherein said watertight element is made of a polyamide made from a polymer of 11-aminoundecanoic acid derived from castor oil.

* * * * *